Aug. 5, 1958     T. PELLEGRINI     2,845,839
DISSOLVING SHUTTER MECHANISM
Filed Aug. 20, 1952
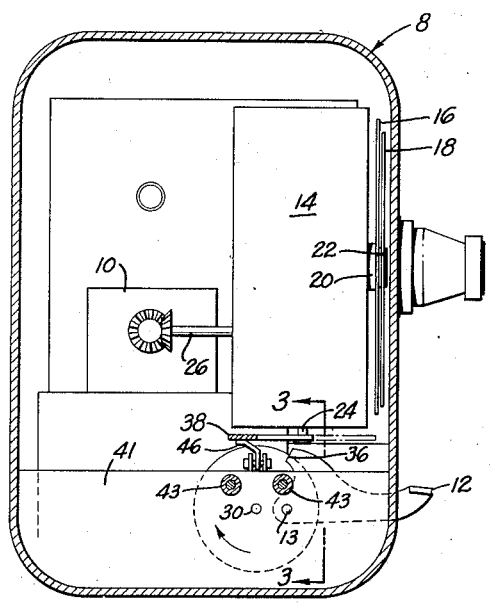
FIG_1_
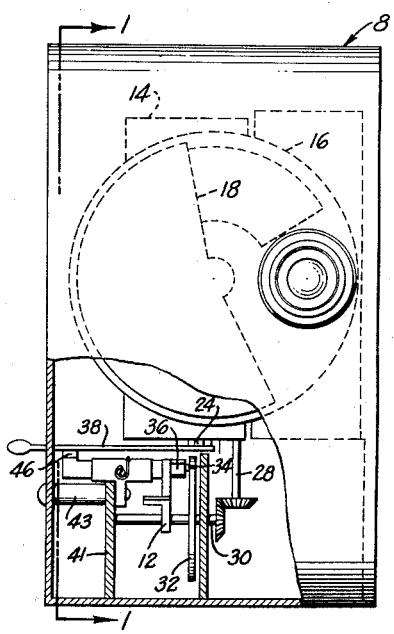
FIG_2_
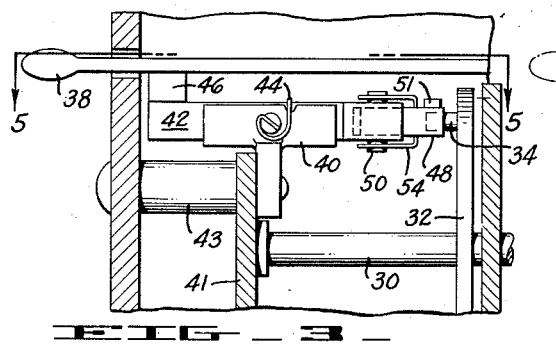
FIG_3_
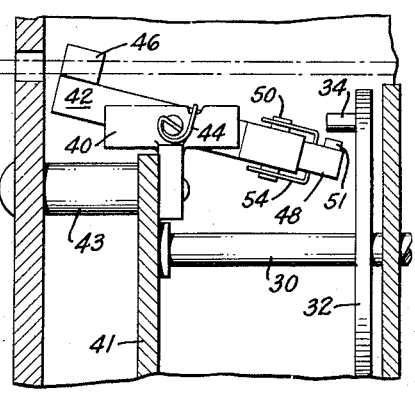
FIG_4_
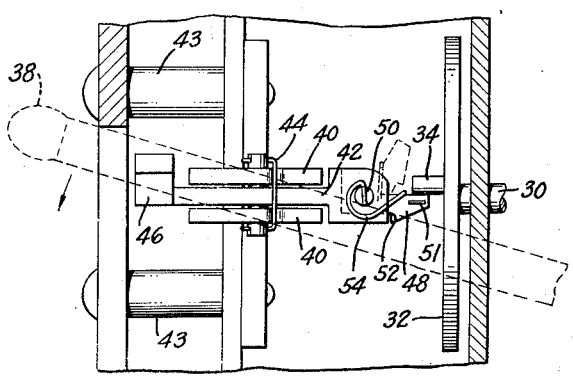
FIG_5_
INVENTOR.
Tullio Pellegrini
ECKHOFF & SLICK, Attys.
BY
A member of the firm

United States Patent Office 2,845,839
Patented Aug. 5, 1958

2,845,839

DISSOLVING SHUTTER MECHANISM

Tullio Pellegrini, San Francisco, Calif.

Application August 20, 1952, Serial No. 305,489

3 Claims. (Cl. 88—16)

This invention relates to a variable shutter control mechanism for a motion picture camera and particularly relates to a control mechanism wherein the variable shutter control itself may be used to both start and stop the camera mechanism.

Variable shutters for motion picture cameras are well known in the art and are extensively used for various photographic effects such as fade-ins, fade-outs, lap dissolves, exposure changes during panoramic shots and to shorten exposure time for fast action shots. A typical variable shutter mechanism is shown in Wittel patent, 1,912,749.

When using a conventional variable shutter there is always the danger that one will forget that the variable shutter is in the closed position and attempt to operate the camera while the shutter is closed. Further, an awkward situation is produced when making a fade-in sequence since one must simultaneously start the camera mechanism and also slowly open the variable shutter. Although various devices have been proposed to warn the user when the variable shutter is closed, I am not aware of any variable shutter control which is capable of starting the operation of the camera independent of the normal starting lever of the camera.

It is therefore an object of the present invention to provide a variable shutter for a motion picture camera having a control mechanism wherein the control mechanism will automatically stop the camera when the variable shutter is closed and which will also automatically start the camera as the variable shutter is opened.

Another object of this invention is to provide a variable shutter control mechanism which will not interfere with backwards operation of the camera mechanism.

In the drawings Figure 1 is a side elevation on the lines 1—1 of Figure 2 of a motion picture camera equipped with the improved variable shutter control of the present invention.

Figure 2 is a front elevation of a motion picture camera embodying the present invention.

Figure 3 is a sectional view of a portion of the mechanism on the lines 3—3 of Figure 1.

Figure 4 is a sectional view on the same plane as Figure 3 showing the parts in a different operating position.

Figure 5 is a sectional view on the lines 5—5 of Figure 3.

Referring now to the drawings by reference characters, there is shown a motion picture camera having a frame or body member 8, a prime mover, such as a spring wound motor 10 and a control lever 12. Within the member designated 14 is the mechanism for advancing the film a frame at a time, for rotating the shutter in synchronism with the film advancing member and for moving the blades of the variable shutter relative to each other. The exact mechanism has not been illustrated as it is well known to those skilled in the art.

Two shutter blades designated 16 and 18 are provided which are operated on shafts 20 and 22 respectively.

The blades 16 and 18 have apertures therein which are each somewhat less than 180° so that the two blades may be turned to a position where their openings coincide to provide a fully open shutter or may be turned relative to each other so that their apertures are not in alignment, completely closing the shutter. Of course, any intermediate degree of an exposure may be secured by turning the two shutters relative to each other. In ordinary operation, the shafts 20 and 22 would be turned at the same rate of speed, thereby providing a constant exposure. However, when it is desired to change the exposure, the shafts are turned relative to each other as is well known to those skilled in the art. The relative movement of the two shutters is controlled by the shaft 24.

The shutter advancing mechanism is driven by the prime mover 10 operating through the shaft 26, and means are provided for stopping the movement by the action of the lever 12. This action is secured through the shaft 28 which turns the shaft 30 which has a wheel 32 thereon. The wheel 32 has a pin 34 extending at right angles to the surface of the wheel so that a projection 36 on arm 12 may engage the pin 34 to stop the camera. The lever 12 is pivoted at 13, and may be moved up and down so that the projection 36 will engage or clear the pin 34, depending on the position of lever 12. In the embodiment illustrated I have shown a single pin 34 on the wheel 32 so that the wheel 32 would ordinarily make one revolution for each revolution of the shutter and the synchronization between the movement of the wheel 32 and the shutter is such that the camera will always stop with the shutter in the closed position. Of course, the wheel 32 might be equipped with two pins 34 and revolve at half the shutter's speed to secure the same results.

The camera thus far described is purely conventional and one may stop or start the camera by the action of the lever 12 and control the opening of the variable shutter by movement of the shaft 24.

In order to provide a control for the variable shutter which will both stop and start the camera, a lever arm 38 is provided on the shaft 24. This extends beyond the case of the camera so that one can control the opening of the variable shutter by movement of the arm in horizontal plane. When the arm 38 is in its rearmost position, as is shown in Figure 1, the shutter is closed, while the shutter is opened when the arm 38 is moved forward.

Pivoted on bracket member 40 is the arm 42. The bracket 40 is held by the sub frame 41 which is braced by the supports 43. A spring 44 biases arm 42 to the position shown in Figure 4. One end of the arm 42 terminates in a cam extension 46. The cam 46 engages the arm 38 as the arm 38 is moved to the position wherein the variable shutter is closed. Thus, as the arm 38 moves to the rear as is shown in Figure 1, the cam 46 is depressed, bringing the arm 42 into the horizontal position shown in detail in Figure 3. When in this position, the tip 48 of the arm 42 is brought into alignment with the path of the pin 34 so that the movement of the camera is stopped. In other words, as the variable shutter is closed, the cam 46 is activated by the lever 38 bringing the tip 48 into alignment with pin 34 which stops the action of the camera. It will be noted that, as the action is reversed, i. e., as the lever 38 is moved forward to open the variable shutter, the cam 46 will be disengaged from the lever arm 38, permitting arm 42 to assume the position shown in Figure 4 and thus starting the action of the camera.

For many photographic effects, such as a lap dissolve, the camera must be handcranked backwards after the shutter has been closed. To permit this action to take place, the tip 48 is made so it will pivot in one direction, as is shown in detail in Figure 5. The tip 48 is pivoted on the arm 42 by means of a pin 50. A stop 52 on the tip 48 restrains the tip 48 and the tip 48 is biased against the stop 52 by means of the spring 54. Therefore, when the arm 42 is in horizontal position, as is shown in Figure 3, the tip 48 engages the pin 34 stopping the camera from forward movement. However, if the camera is cranked in a backward direction, the pin 34 will displace the tip 48, as is shown in dotted lines in Figure 5, thus permitting the camera to operate freely in a reverse direction.

In the foregoing description, it is obvious that the arm 12 must remain in a position to render the camera operative, in order that the starting and stopping of the camera may be controlled by the lever 38.

The arm 38 is preferably secured on shaft 24 in such a manner that the shutter will be closed slightly before the arm 38 actuates the cam 46. In this way, one may operate the camera forward with the variable shutter closed. In order that the user will be warned that the shutter blades are closed, an audible warning is provided. One method of providing the audible warning is the use of a small projection 51 on the tip 48. The projection 51 is of flexible, thin metal of insufficient strength to stop the mechanism of the camera. As the lever 38 is moved to the rear of the camera closing the variable shutter and actuating the cam 46, the projection 51 is brought into contact with the pin 34, producing a series of audible clicks which warn the user that the shutter is closed. As the lever 38 is brought further to the rear, the tip 48 is brought into the path of pin 34, stopping the camera.

From the foregoing description, it will be apparent that I have provided a control for a variable shutter mechanism wherein the control lever for the variable shutter mechanism itself serves to both stop and to start the camera, but does not prevent the camera from being hand cranked in the reverse direction.

I claim:

1. In combination with a motion picture camera having a variable shutter and a lever to regulate the aperture of the variable shutter, a rotating member within said camera operated in synchronization with the shutter mechanism and having a pin located thereon, stop means comprising an arm adapted to engage said pin and being normally spring biased in a position to not engage said pin, a cam on said arm engaged by said lever whereby said arm is brought into an operative position to stop the camera as the lever is moved to close the variable shutter and whereby said arm is brought into position to permit the operation of the camera when said lever is moved to a position to open the variable shutter.

2. The apparatus of claim 1 wherein the arm terminates in a spring biased detent pivoted to yield in one direction only, said detent yielding to permit the operation of the camera in the reversed direction and to prevent the operation of the camera in a forward direction.

3. The apparatus of claim 1 wherein the arm terminates in a tip having a flexible metal projection thereon, said projection being adapted to produce an audible warning sound when brought into the path of said pin.

References Cited in the file of this patent

UNITED STATES PATENTS

| | | |
|---|---|---|
| 1,417,005 | Wescott | May 23, 1922 |
| 2,065,777 | Weissbrodt | Dec. 29, 1936 |
| 2,117,694 | Becker | May 17, 1938 |
| 2,319,204 | Bolsey | May 18, 1943 |
| 2,376,301 | Widmer | May 15, 1945 |
| 2,515,330 | Bolsey | July 18, 1950 |
| 2,808,756 | Gouffon | Oct. 8, 1957 |

FOREIGN PATENTS

| | | |
|---|---|---|
| 944,825 | France | Nov. 15, 1948 |
| 647,250 | Great Britain | Dec. 6, 1950 |